United States Patent
Ku et al.

(10) Patent No.: US 7,833,394 B2
(45) Date of Patent: Nov. 16, 2010

(54) HOUSING, APPARATUS FOR GENERATING HYDROGEN AND FUEL CELL POWER GENERATION SYSTEM HAVING THE SAME

(75) Inventors: Bo-Sung Ku, Suwon-si (KR); Jae-Hyuk Jang, Seoul (KR); Kyoung-Soo Chae, Suwon-si (KR); Hye-Yeon Cha, Yongin-si (KR); Jae-Hyoung Gil, Seoul (KR); Chang-Ryul Jung, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 38 days.

(21) Appl. No.: 12/318,913

(22) Filed: Jan. 12, 2009

(65) Prior Publication Data

US 2009/0297899 A1 Dec. 3, 2009

(30) Foreign Application Priority Data

May 27, 2008 (KR) ...................... 10-2008-0049141

(51) Int. Cl.
*C25B 1/04* (2006.01)
(52) U.S. Cl. ..................................................... 204/278
(58) Field of Classification Search ........................ None
See application file for complete search history.

(56) References Cited

U.S. PATENT DOCUMENTS

| | | | | |
|---|---|---|---|---|
| 4,359,327 A * | 11/1982 | Armand et al. | ............... | 95/116 |
| 2002/0100682 A1* | 8/2002 | Kelley et al. | ................ | 204/266 |
| 2004/0060444 A1* | 4/2004 | Smith et al. | .................. | 96/108 |
| 2004/0118677 A1* | 6/2004 | Streckert et al. | ............ | 204/237 |
| 2007/0020172 A1* | 1/2007 | Withers-Kirby et al. | .. | 423/648.1 |

FOREIGN PATENT DOCUMENTS

JP       2004-269323 A  *  9/2004

* cited by examiner

*Primary Examiner*—Harry D Wilkins, III

(57) ABSTRACT

Disclosed are a housing, an apparatus for generating hydrogen and a fuel cell power generation system having the same. The housing in accordance with an embodiment of the present invention includes a case, a hollow space formed in the case, a cartridge being inserted in the hollow space, the cartridge configured to generate hydrogen; and a moisture removing layer, being formed on a wall of the hollow space and including chemical hydride. The housing is capable of removing both water vapor, included in the hydrogen generated by the apparatus for generating hydrogen, and dew, condensed in the housing, and obtaining additional hydrogen by hydrolyzing the water vapor and the condensed dew.

20 Claims, 4 Drawing Sheets

HOUSING, APPARATUS FOR GENERATING HYDROGEN AND FUEL CELL POWER GENERATION SYSTEM HAVING THE SAME

CROSS-REFERENCE TO RELATED APPLICATIONS

This application claims the benefit of Korean Patent Application No. 10-2008-0049141, filed with the Korean Intellectual Property Office on May 27, 2008, the disclosure of which is incorporated herein by reference in its entirety.

BACKGROUND

1. Technical Field

The present invention relates to a housing, an apparatus for generating hydrogen and a fuel cell power generation system that have the same.

2. Description of the Related Art

A fuel cell performs a function of directly converting chemical energy of fuel such as hydrogen, LNG, LPG, etc., and air into electricity and heat through an electrochemical reaction. While a conventional power generation technology adopts fuel combustion, vapor generation and turbine-driven processes, the fuel cell has neither the combustion process nor the turbine driven process. Accordingly, the fuel cell is a new high efficiency, environmentally-friendly power generation technology.

Fuel cells being studied for application in small portable electronic devices include the Polymer Electrolyte Membrane Fuel Cell (PEMFC), which uses hydrogen as the fuel, and a direct liquid fuel cell, such as the Direct Methanol Fuel Cell (DMFC), which uses liquid fuel. The Polymer Electrolyte Membrane Fuel Cell has a high power density but requires a separate device for supplying hydrogen.

Methods of generating hydrogen as fuel for the Polymer Electrolyte Membrane Fuel Cell use aluminum oxidation reaction, hydrolysis of metallic borohydrides or metallic electrode reaction, among which the metallic electrode reaction method can efficiently control the hydrogen generation. Generating hydrogen through a water decomposition reaction by connecting an electron, which is obtained by ionizing an electrode of magnesium into an $Mg^{2+}$ ion, to another metal body through a wire, the metallic electrode reaction method can control the generation of hydrogen by connecting/disconnecting the connected wire and by changing a gap between the electrodes being used and by changing the size of the electrodes.

However, when the hydrogen generation is based on water, only pure hydrogen needs to be supplied in order to operate the fuel cell. The inflow of water vapor hinders the performance and causes the fuel cell to malfunction. This is an essential issue that needs to be resolved for application in portable power supplies, in which mobility is of virtue.

SUMMARY

The present invention provides a housing capable of removing both water vapor included in the hydrogen generated by an apparatus for generating hydrogen and condensed dew generated in the housing, and capable of obtaining additional hydrogen by using the water vapor and the condensed dew as well, and provides the apparatus for generating hydrogen and a fuel cell power generation system having the same.

An aspect of the present invention features a housing. The housing in accordance with an embodiment of the present invention can include: a case, a hollow space formed in the case, a cartridge being inserted in the hollow space, the cartridge configured to generate hydrogen; and a moisture removing layer, being formed on a wall of the hollow space and including chemical hydride.

The chemical hydride can include at least any one selected from a group consisting of $MgH_2$, $LiBH_4$, $NaBH_4$, $CaH_2$, and NaH. The moisture removing layer can further include ruthenium (Ru) or carbon (C). The moisture removing layer can be structured in a shape that is similar to a net.

The case can include a vessel, including the hollow space, one side of the hollow space being open; and a cap, configured to cover the open hollow space. Further included can be a sealing material interposed between the vessel and the cap such that the hydrogen is prevented from leaking.

Further included can be a controller electrically connected to the cartridge and configured to control an amount of hydrogen being generated.

Another aspect of the present invention features an apparatus for generating hydrogen. The apparatus for generating hydrogen in accordance with an embodiment of the present invention can include: a cartridge, including electrodes configured to generate hydrogen by decomposing an electrolyte solution; a case, a hollow space formed in the case, the cartridge being inserted in the hollow space; and a moisture removing layer, being formed on a wall of the hollow space and including chemical hydride.

The chemical hydride can include at least any one selected from a group consisting of $MgH_2$, $LiBH_4$, $NaBH_4$, $CaH_2$, and NaH. The moisture removing layer can further include ruthenium (Ru) or carbon (C). The moisture removing layer can be structured in a shape that is similar to a net.

The case can include a vessel, including the hollow space, one side of the hollow space being open; and a cap, configured to cover the open hollow space. A sealing material can be interposed between the vessel and the cap such that the hydrogen is prevented from leaking.

The cartridge can form a connection terminal electrically connected to the electrodes and formed on one side of the cartridge. The cartridge can further include a controller electrically connected to the connection terminal and configured to control an amount of hydrogen being generated.

The cartridge can include an electrolyte solution; electrodes, including an anode configured to generate an electron in the electrolyte solution and a cathode configured to receive the electron and generate the hydrogen from the electrolyte solution; a liquid-gas separation membrane being disposed to surround the anode and the cathode in order to separate the hydrogen from the electrolyte solution and release the hydrogen to the outside; and a support, being formed at an outside of the liquid-gas separation membrane to prevent the liquid-gas separation membrane from expanding.

The support can be structured in a shape that is similar to a net. The liquid-gas separation membrane can be made of a material including a hydrophobic material having a plurality of pores. The support can also include chemical hydride.

Yet another aspect of the present invention features a fuel cell power generation system. The fuel cell power generation system in accordance with an embodiment of the present invention can include: an apparatus for generating hydrogen; and a fuel cell, configured to generate electrical energy by converting chemical energy of hydrogen generated from the apparatus for generating hydrogen, wherein the apparatus for generating hydrogen includes: a cartridge, including electrodes configured to generate hydrogen by decomposing an electrolyte solution; a case, a hollow space formed in the case, the cartridge being inserted in the hollow space; and a moisture removing layer, being formed on an inner wall of the hollow space and including chemical hydride.

The chemical hydride can include at least any one selected from a group consisting of $MgH_2$, $LiBH_4$, $NaBH_4$, $CaH_2$, and NaH. The moisture removing layer can further include ruthenium (Ru) or carbon (C). The moisture removing layer can be structured in a shape that is similar to a net.

The case can include a vessel, including the hollow space, one side of the hollow space being open; and a cap, configured to cover the open hollow space. A sealing material can be interposed between the vessel and the cap such that the hydrogen is prevented from leaking.

The cartridge can form a connection terminal electrically connected to the electrodes and formed on one side of the cartridge. The cartridge can include a controller electrically connected to the connection terminal and configured to control an amount of hydrogen being generated.

The cartridge can include an electrolyte solution; electrodes, including an anode configured to generate an electron in the electrolyte solution and a cathode configured to receive the electron and generate the hydrogen from the electrolyte solution; a liquid-gas separation membrane, being disposed to surround the anode and the cathode in order to separate the hydrogen from the electrolyte solution and release the hydrogen to the outside; and a support, formed at an outside of the liquid-gas separation membrane to prevent the liquid-gas separation membrane from expanding.

The support can be structured in a shape that is similar to a net. The liquid-gas separation membrane can be made of a material including a hydrophobic material having a plurality of pores. The support can include chemical hydride.

DETAILED DESCRIPTION

Figure 1:
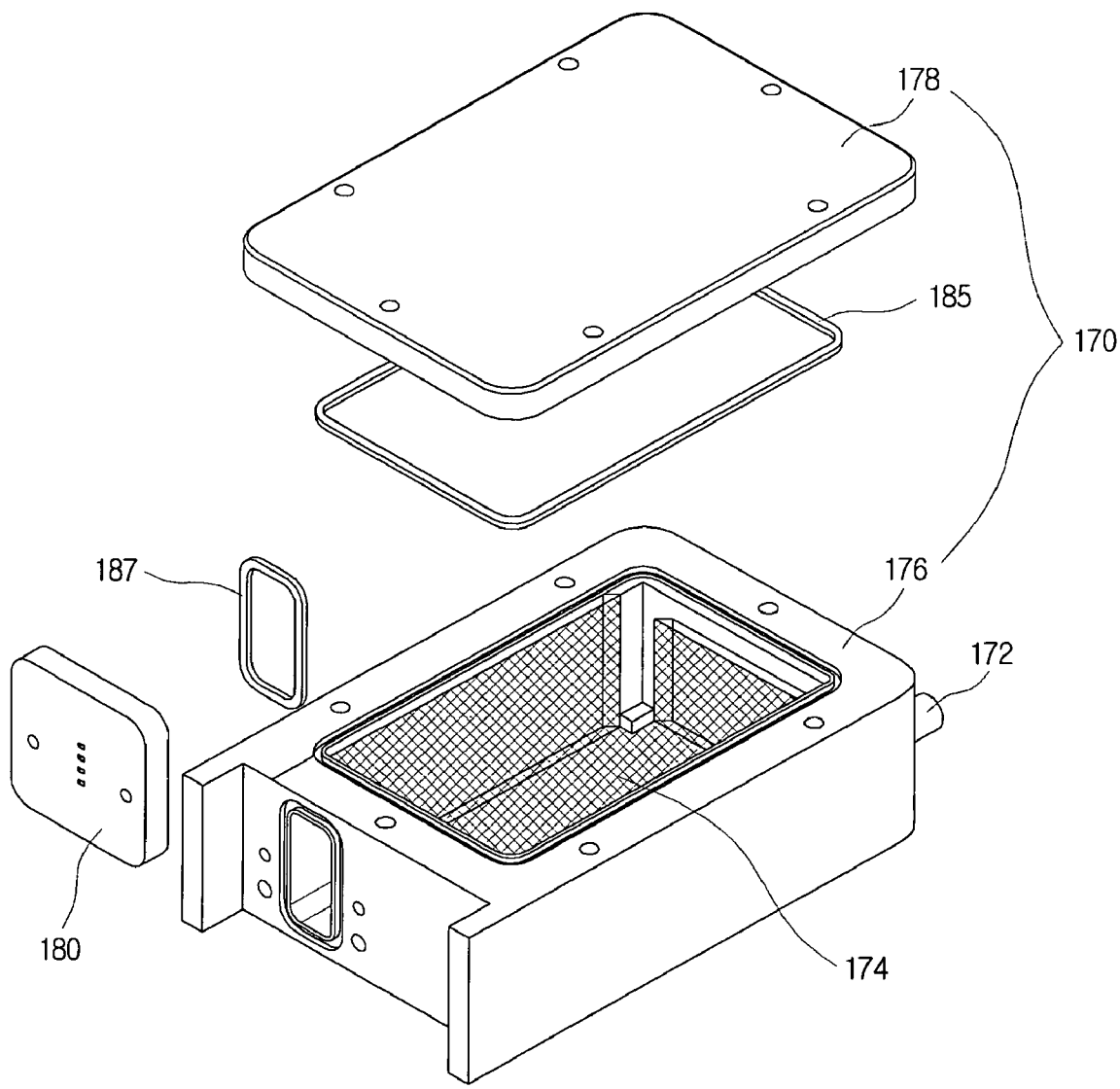
FIG. 1 illustrates a perspective view of an embodiment of a housing according to an aspect of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. In the following description of the present invention, the detailed description of known technologies incorporated herein will be omitted when it may make the subject matter unclear.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Further, the term of combination will be used as a concept including not only a case where elements come in physical contact with each other directly, but also a case where another element is interposed between all of the elements such that each element comes in direct contact with the another element.

Hereinafter, embodiments of a housing, an apparatus for generating hydrogen and a fuel cell power generation system having the same will be described in detail with reference to the accompanying drawings. In description with reference to accompanying drawings, the same reference numerals will be assigned to the same or corresponding elements, and repetitive descriptions thereof will be omitted.

An embodiment of an apparatus for generating hydrogen in accordance with an aspect of the present invention will be described. FIG. 1 illustrates a perspective view of an embodiment of a housing according to an aspect of the present invention. Referring to FIG. 1, illustrated are a housing 100, a case 170, a hydrogen outlet 172, a moisture removing layer 174, a vessel 176, a cap 178, a controller 180 and sealing materials 185 and 187.

According to the embodiment of the present invention, the housing 100 capable of more efficiency supplying hydrogen is provided by adding the moisture removing layer 174 including chemical hydride to the wall surface of a hollow space into which a cartridge is inserted.

The housing 100 collects hydrogen generated by the cartridge and provides a fuel cell with the hydrogen. Because the electrolyte and the electrodes of the fuel cell are required to be changed, the cartridge is made to be changeable. Then hydrogen, that is, an energy source for the fuel cell can be provided by inserting the cartridge into the housing 100.

The case 170 having the formed hollow space corresponds to a body of the housing, the hollow space being inserted by the cartridge. One side of the case can have the hydrogen outlet 172. The hydrogen generated by the cartridge can be provided to the fuel cell and the like through the hydrogen outlet 172. The case 170 can further include both the vessel including the hollow space having one open side and the cap 178 covering the open hollow space. When the vessel is combined with the cap in order to cover the hollow space, it is possible to hermetically cover the hollow space by interposing the seal material 185 between the cap 178 and the vessel so as to prevent the hydrogen from leaking through a combination gap.

Since the hydrogen generated by the cartridge comes out from the cartridge through an electrolyte, water vapor can be included in the hydrogen. Further, since a hydrogen generation reaction is both an oxidation-reduction reaction and an exothermic reaction, a water drop may be formed on the wall surface of the hollow space of the case 170, the water drop resulting from dew condensation caused by a temperature difference between the inside and the outside of the housing 100.

Because only pure hydrogen is necessarily provided for the purpose of efficiently operating the fuel cell, the housing 100 according to the embodiment of the present invention is allowed to remove both the moisture included in the hydrogen formed by the cartridge and the water drop formed on the wall surface of the hollow space by adding the moisture removing layer 174 to the wall surface of the hollow space.

The moisture removing layer 174 includes chemical hydride, such as $MgH_2$, $LiBH_4$, $NaBH_4$, $CaH_2$, NaH and the like. The chemical hydride including hydrogen ion is capable of generating hydrogen through a hydrolysis reaction with water.

The hydrolysis reaction of the chemical hydride is described in the following chemical equations.

$$MgH_2+2H_2O \rightarrow Mg(OH)_2+2H_2$$

$$LiBH_4+H_2O \rightarrow LiOH+H_3BO_3+4H_2$$

$$NaBH_4+2H_2O \rightarrow NaBO_2+4H_2$$

$$CaH_2+2H_2O \rightarrow Ca(OH)_2+2H_2$$

$$NaH+H_2O \rightarrow NaOH+H_2 \quad (1)$$

Referring to the chemical equations above, since the chemical hydride generates hydrogen by reacting with water, water can be removed and hydrogen is generated as a result of the reaction as well. Therefore, a hydrogen yield of the apparatus for generating hydrogen can be improved.

The moisture removing layer 174 can further include a catalyst for promoting the hydrolysis reaction. Ruthenium (Ru) or carbon (C) can be an example of the catalyst.

The moisture removing layer 174 can have a film type formed on the wall surface of the hollow space. If the moisture removing layer is structured in a shape that is similar to a net, gas is able to pass through the layer and the contact area thereof is wide, which can cause the hydrolysis reaction to occur more actively. The moisture removing layer 174 can be formed either only around the hydrogen outlet 172 or on the entire wall surface of the hollow space as illustrated in FIG. 1. If the moisture removing layer 174 is formed on the entire wall surface of the hollow space, water resulting from the dew condensation can be removed more effectively.

As the controller 180 is electrically connected to the cartridge, it can control the oxidation-reduction reaction at the inside of the cartridge and control the time taken for generating the hydrogen and the amount of the hydrogen being generated from the electrodes. In other words, the controller 180 is able to reduce the amount of electrons which move according to a required amount of hydrogen. For example, the controller 180 can control the amount of moving electrons either by being made of variable resistances and changing the value of a variable resistance or by being made of switches and adjusting an on-off timing.

The sealing material 187 is also interposed between the case 170 and the controller 180, such that the hydrogen generated from the cartridge can be provided to an external device such as a fuel cell, etc., without leakage of the hydrogen to the outside.

Figure 2:
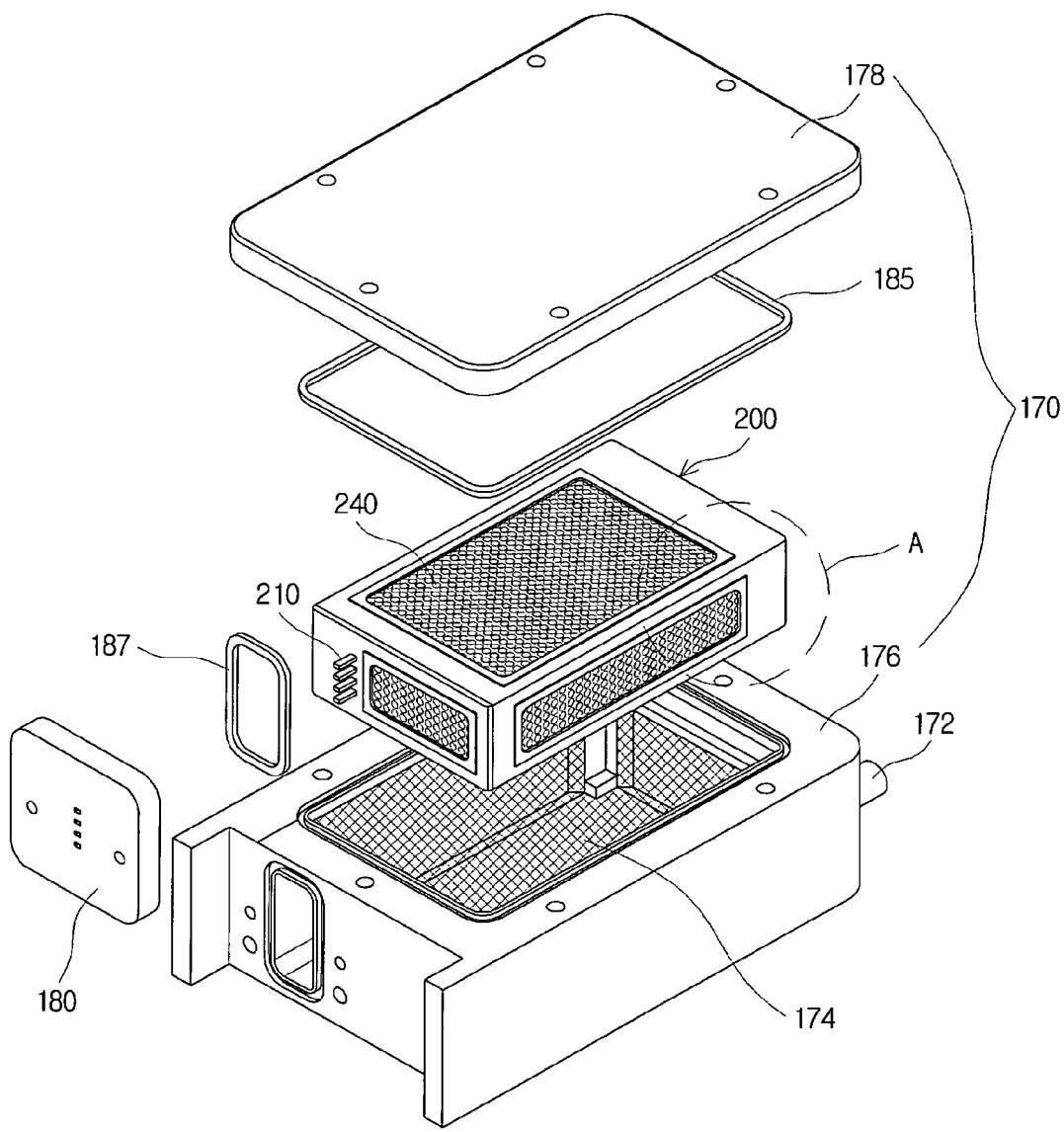
FIG. 2 illustrates a perspective view of an embodiment of an apparatus for generating hydrogen according to another aspect of the present invention.

FIG. 2 illustrates a perspective view of an embodiment of an apparatus for generating hydrogen according to another aspect of the present invention. Referring to FIG. 2, illustrated are a housing 100, a case 170, a hydrogen outlet 172, a moisture removing layer 174, a vessel 176, a cap 178, a controller 180, sealing materials 185 and 187, a cartridge 200, a support 240 and a connection terminal 210.

The cartridge 200 is a hydrogen generating unit having basic elements, such as an electrolyte for generating hydrogen, an anode and a cathode. Because the oxidation-reduction reaction for generating hydrogen consumes the electrodes and the electrolyte, the cartridge 200 is made to be changeable.

Figure 3:
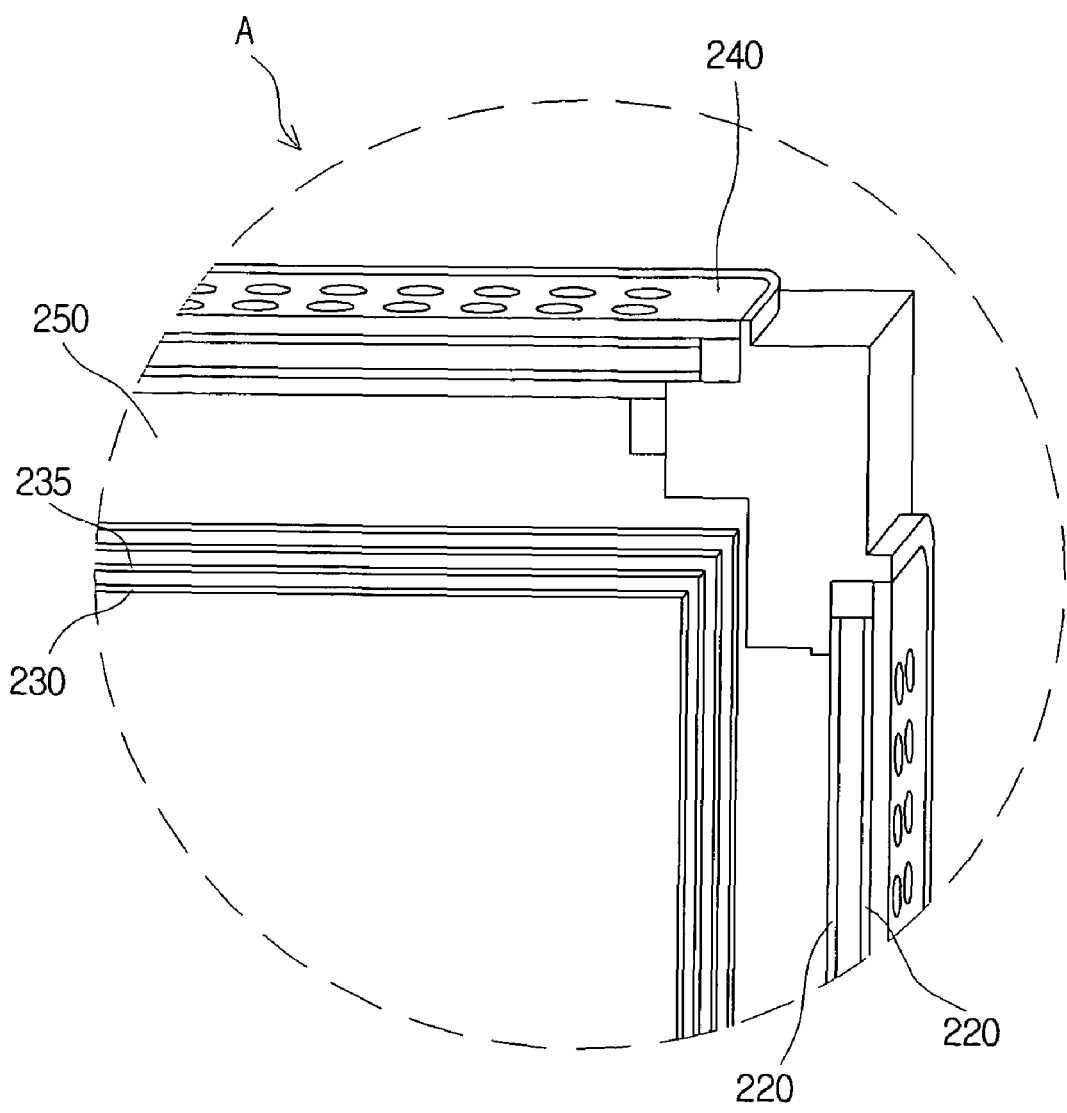
FIG. 3 illustrates a partial dissection view of a part of "A" of FIG. 2

In the present embodiment, disclosed is an apparatus for generating hydrogen, which makes use of a cartridge capable of preventing an electrolyte solution from reversely flowing when hydrogen is generated, and preventing the electrolyte solution from leaking when the apparatus moves. FIG. 3 illustrates a partial dissection view of a part of "A" of FIG. 2. Illustrated in FIG. 3 are a liquid-gas separation membrane 220, a support 240 and electrolyte solution 250, including an anode 230, a cathode 235.

A hydrogen generation reaction inside the cartridge 200, that is, a reaction that occurs at the anode 230 and the cathode 235 will be described. An electron is generated at the anode 230 and then the cathode 235 receives an electron generated by the anode 230 and generates hydrogen.

The anode 230 can be made of a metal like magnesium having high ionization tendency. Because the anode 230 is oxidized, releasing electrons into the electrolyte solution 250 due to difference between the ionization tendencies of the anode 230 and hydrogen, the anode 230 is consumed continuously.

Meanwhile, the cathode 235 can be made of a metal like Stainless Steel having lower ionization tendency than that of the anode 230. Because the cathode 235 of an inert electrode is not consumed unlike the anode 230, the cathode 235 can be implemented such that it has anode 230.

Chemical reactions at the anode 230 and the cathode 235 are described in the following chemical equations.

Anode 230: $Mg \rightarrow Mg^{2+}+2e-$

Cathode 235: $2H_2O+2e- \rightarrow H_2+2(OH)-$

Full reaction: $Mg+2H_2O \rightarrow Mg(OH)_2+H_2 \quad (2)$

LiCl, KCl, NaCl, KNO₃, NaNO₃, CaCl₂, MgCl₂, K₂SO₄, Na₂SO₄, MgSO₄, AgCl or any combination of them and so on can be used as the electrolyte solution 250. The electrolyte solution 250 can include hydrogen ion.

The a liquid-gas separation membrane 220 can be disposed such that it surrounds the anode 230 and the cathode 235 in order to separate the hydrogen generated by the cathode 235 from the electrolyte solution 250 and release the hydrogen to the outside.

That is, the liquid-gas separation membrane 220 can be made of hydrophobic material having a plurality of pores, i.e., poly tetra fluoro ethylene (PTFE), and can be disposed such that it surrounds the anode 230 and the cathode 235. For that reason, when hydrogen is generated by injecting the electrolyte solution 250 into the inside of the liquid-gas separation membrane 220, the hydrogen is separated from the electrolyte solution 250 and can be released to the outside through the entire surface of the liquid-gas separation membrane 220.

Accordingly, when hydrogen is generated, the electrolyte solution 250 can be prevented from reversely flowing, accompanied by the hydrogen, and when the apparatus moves, the electrolyte solution 250 can be prevented from flowing and leaked to the outside. Consequently, it is possible to increase the hydrogen generation efficiency of the apparatus for generating hydrogen.

In spite of pressure rise according to the hydrogen generation, the shape of the cartridge 200 is prevented from changing by forming the support 240 at the outside of the liquid-gas separation membrane 220 in order to prevent the liquid-gas separation membrane 220 from expanding. In consequence, the hydrogen generation reaction can occur with stability. If the support 240 is structured in a shape that is similar to a net, hydrogen can be easily released to the outside of the cartridge such that the hydrogen generation efficiency can be improved. The chemical hydride can be included in the support in order that the cartridge itself generates hydrogen by additionally removing the moisture. Since the chemical hydride has been described in detail in the foregoing description of the moisture removing layer, the descriptions thereof will be omitted.

The connection terminal 210 electrically connected to the anode 230 and the cathode 235 can electrically connect the anode 230 and the cathode 235 to the controller 180. The connection terminal 210 can be formed on one side of the cartridge 200 and connected to the controller 180. The controller 180 can control the application of an electric current between the anode 230 and the cathode 235. Therefore, the time taken for generating hydrogen and the amount of the hydrogen being generated by the cathode 235 can be controlled.

Since the housing 100, the case 170, the hydrogen outlet 172, the moisture removing layer 174, the cap 178, the controller 180, the sealing materials 185 and 187 have been described in detail in the foregoing description about the housing according to one aspect of the present invention, the detailed descriptions thereof will be omitted.

Figure 4:
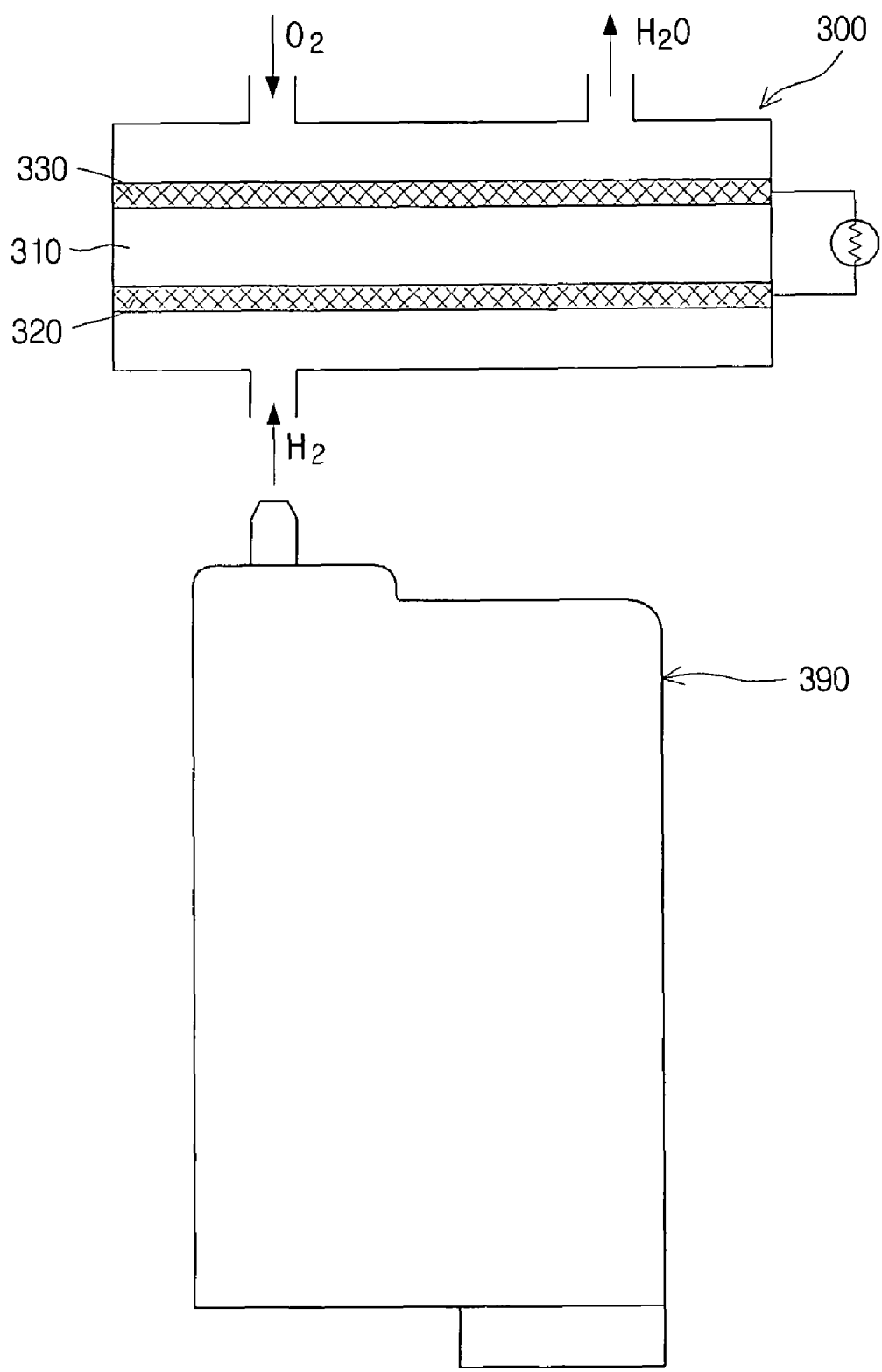
FIG. 4 illustrates a schematic view of an embodiment of a fuel cell power generation system according to another aspect of the present invention.

FIG. 4 illustrates a schematic view of an embodiment of a fuel cell power generation system according to another aspect of the present invention. Referring to FIG. 4, illustrated in FIG. 4 are a fuel cell 300, an electrolyte 310, a fuel electrode 320, an air electrode 330 and an apparatus for generating hydrogen 390.

According to the present embodiment, the liquid-gas separation membrane (see reference numeral 220 of FIG. 3) is disposed to surround the anode (see reference numeral 230 of FIG. 3) and the cathode (see reference numeral 235 of FIG. 3). Moreover, a support (see reference numeral 240 of FIG. 3) is included for preventing the liquid-gas separation membrane (see reference numeral 220 of FIG. 3) from expanding. Through this procedure, the efficiency and stability of hydrogen generation can be improved and the cartridge can be simply changed. As a result, disclosed is a fuel cell power generation system capable of generating electrical energy more effectively.

In the present embodiment, since the configuration and operations of the apparatus for generating hydrogen 390 are the same as or correspond to those of the embodiment described above, the descriptions thereof will be omitted. Hereinafter, the fuel cell 300, i.e., the difference between an embodiment described above and the present embodiment will be described.

The fuel cell 300 can generate electrical energy by converting the chemical energy of the hydrogen generated by the cartridge (see reference numeral 200 of FIG. 2) into electrical energy. Low humid hydrogen can be transferred to the fuel electrode 320 of the fuel cell 300, the low humid hydrogen being generated by the cartridge (see reference numeral 200 of FIG. 2) of the apparatus for generating hydrogen 390. Accordingly, it is possible to generate direct current by changing the chemical energy of the hydrogen generated by the apparatus for generating hydrogen 390 into electrical energy.

While the present invention has been described focusing on exemplary embodiments thereof, it will be understood by those skilled in the art that various changes and modification in forms and details may be made without departing from the spirit and scope of the present invention as defined by the appended claims.

Numerous embodiments other than embodiments described above are included within the scope of the present invention.

What is claimed is:

1. An apparatus for generating hydrogen, comprising:
   a cartridge, comprising electrodes configured to generate hydrogen by decomposing an electrolyte solution;
   a case, a hollow space formed in the case, the cartridge being inserted in the hollow space; and
   a moisture removing layer, being formed on a wall of the hollow space and comprising chemical hydride,
   wherein the cartridge comprises
   an electrolyte solution,
   electrodes, comprising an anode configured to generate an electron in the electrolyte solution and a cathode configured to receive the electron and generate the hydrogen from the electrolyte solution,
   a liquid-gas separation membrane being disposed to surround the anode and the cathode in order to separate the hydrogen from the electrolyte solution and release the hydrogen to the outside, and
   a support, including chemical hydride, being formed at an outside of the liquid-gas separation membrane to prevent the liquid-gas separation membrane from expanding.

2. The apparatus of claim 1, wherein the chemical hydride comprises at least any one selected from a group consisting of $MgH_2$, $LiBH_4$, $NaBH_4$, $CaH_2$, and $NaH$.

3. The apparatus of claim 1, wherein the moisture removing layer further comprises ruthenium (Ru) or carbon (C).

4. The apparatus of claim 1, wherein the moisture removing layer is structured in a shape that is similar to a net.

5. The apparatus of claim 1, wherein the case comprises:
   a vessel, comprising the hollow space, one side of the hollow space being open; and
   a cap, configured to cover the open hollow space.

6. The apparatus of claim 5, further comprising a sealing material interposed between the vessel and the cap so as to prevent the hydrogen from leaking.

7. The apparatus of claim 1, wherein the cartridge comprises a connection terminal electrically connected to the electrodes and formed on one side of the cartridge.

8. The apparatus of claim 7, further comprising a controller electrically connected to the connection terminal and configured to control an amount of hydrogen being generated.

9. The apparatus of claim 1, wherein the support is structured in a shape that is similar to a net.

10. The apparatus of claim 1, wherein the liquid-gas separation membrane is made of a material comprising a hydrophobic material having a plurality of pores.

11. A fuel cell power generation system comprising:
    an apparatus for generating hydrogen; and
    a fuel cell, configured to generate electrical energy by converting chemical energy of hydrogen generated from the apparatus for generating hydrogen,
    wherein the apparatus for generating hydrogen comprises:
    a cartridge, comprising electrodes configured to generate hydrogen by decomposing an electrolyte solution;
    a case, a hollow space formed in the case, the cartridge being inserted in the hollow space; and
    a moisture removing layer, being formed on an inner wall of the hollow space and comprising chemical hydride,
    wherein the cartridge comprises
    an electrolyte solution,
    electrodes, comprising an anode configured to generate an electron in the electrolyte solution and a cathode configured to receive the electron and generate the hydrogen from the electrolyte solution,
    a liquid-gas separation membrane being disposed to surround the anode and the cathode in order to separate the hydrogen from the electrolyte solution and release the hydrogen to the outside, and
    a support, including chemical hydride, being formed at an outside of the liquid-gas separation membrane to prevent the liquid-gas separation membrane from expanding.

12. The fuel cell power generation system of claim 11, wherein the chemical hydride comprises at least any one selected from a group consisting of $MgH_2$, $LiBH_4$, $NaBH_4$, $CaH_2$, and NaH.

13. The fuel cell power generation system of claim 11, wherein the moisture removing layer further comprises ruthenium (Ru) or carbon (C).

14. The fuel cell power generation system of claim 11, wherein the moisture removing layer is structured in a shape that is similar to a net.

15. The fuel cell power generation system of claim 11, wherein the case comprises:
   a vessel, comprising the hollow space, one side of the hollow space being open; and
   a cap, configured to cover the open hollow space.

16. The fuel cell power generation system of claim 15, further comprising a sealing material interposed between the vessel and the cap so as to prevent the hydrogen from leaking.

17. The fuel cell power generation system of claim 11, wherein the cartridge comprises a connection terminal electrically connected to the electrodes and formed on one side of the cartridge.

18. The fuel cell power generation system of claim 17, further comprising a controller electrically connected to the connection terminal and configured to control an amount of hydrogen being generated.

19. The fuel cell power generation system of claim 11, wherein the support is structured in a shape that is similar to a net.

20. The fuel cell power generation system of claim 11, wherein the liquid-gas separation membrane is made of a material comprising a hydrophobic material having a plurality of pores.

* * * * *